United States Patent
Weekes

(10) Patent No.: US 7,216,884 B2
(45) Date of Patent: May 15, 2007

(54) ALUMINUM TRAILER, FRAME AND KIT

(75) Inventor: Gregory L. Weekes, Boynton Beach, FL (US)

(73) Assignee: Eastern Metal Supply, Inc., Lake Worth, FL (US)

( * ) Notice: Subject to any disclaimer, the term of this patent is extended or adjusted under 35 U.S.C. 154(b) by 60 days.

(21) Appl. No.: 11/118,708

(22) Filed: Apr. 29, 2005

(65) Prior Publication Data

US 2006/0181056 A1     Aug. 17, 2006

Related U.S. Application Data

(60) Provisional application No. 60/653,785, filed on Feb. 17, 2005.

(51) Int. Cl.
*B60P 3/10*     (2006.01)
*B62D 63/06*     (2006.01)

(52) U.S. Cl. ............... 280/414.1; 280/789; 280/799; 280/800

(58) Field of Classification Search ............ 280/414.1, 280/789, 799, 800
See application file for complete search history.

(56) References Cited

U.S. PATENT DOCUMENTS

| | | | | |
|---|---|---|---|---|
| 835,547 A | * | 11/1906 | Morse | .......................... 280/788 |
| 2,154,154 A | * | 4/1939 | Eklund | ........................ 280/794 |
| 3,266,836 A | * | 8/1966 | Taylor et al. | ................. 410/54 |
| 3,481,623 A | * | 12/1969 | Campbell | ............. 280/124.111 |
| 3,735,998 A | * | 5/1973 | Green | ........................ 280/795 |
| 3,901,398 A | * | 8/1975 | Bunch | ........................ 414/483 |
| 4,040,640 A | * | 8/1977 | Begg | .......................... 180/292 |
| 5,429,383 A | * | 7/1995 | Reed | ........................ 280/414.1 |
| 5,725,247 A | * | 3/1998 | Nilsson et al. | ............. 280/781 |
| 6,641,160 B1 | * | 11/2003 | Veal | ........................ 280/414.1 |
| 6,733,040 B1 | * | 5/2004 | Simboli | ...................... 280/800 |

\* cited by examiner

*Primary Examiner*—Lesley D. Morris
*Assistant Examiner*—Marlon Arce-Dlaz
(74) *Attorney, Agent, or Firm*—Robert C. Kain, Jr.; Fleit Kain

(57) ABSTRACT

The aluminum trailer frame and trailer includes aluminum side rails with bowed forward sections which converge on an aluminum trailer tongue beam. A plurality of aluminum cross members are laterally mounted to opposing side rails. Each cross member has a generally C-shaped cross section with an embedded, generally C-shaped bolt head channel near the mid-section of the C-shaped cross member. The channel has opposing tabs which trap a bolt head and the channel extends the length of the cross members. Two bunk rail beams or other accessory supports or beam supports are mounted on the cross members via bolts having bolt heads that are slidably disposed in the bolt head channels. Accessories are movably mounted on the cross members by bolts in bolt head channels.

24 Claims, 14 Drawing Sheets

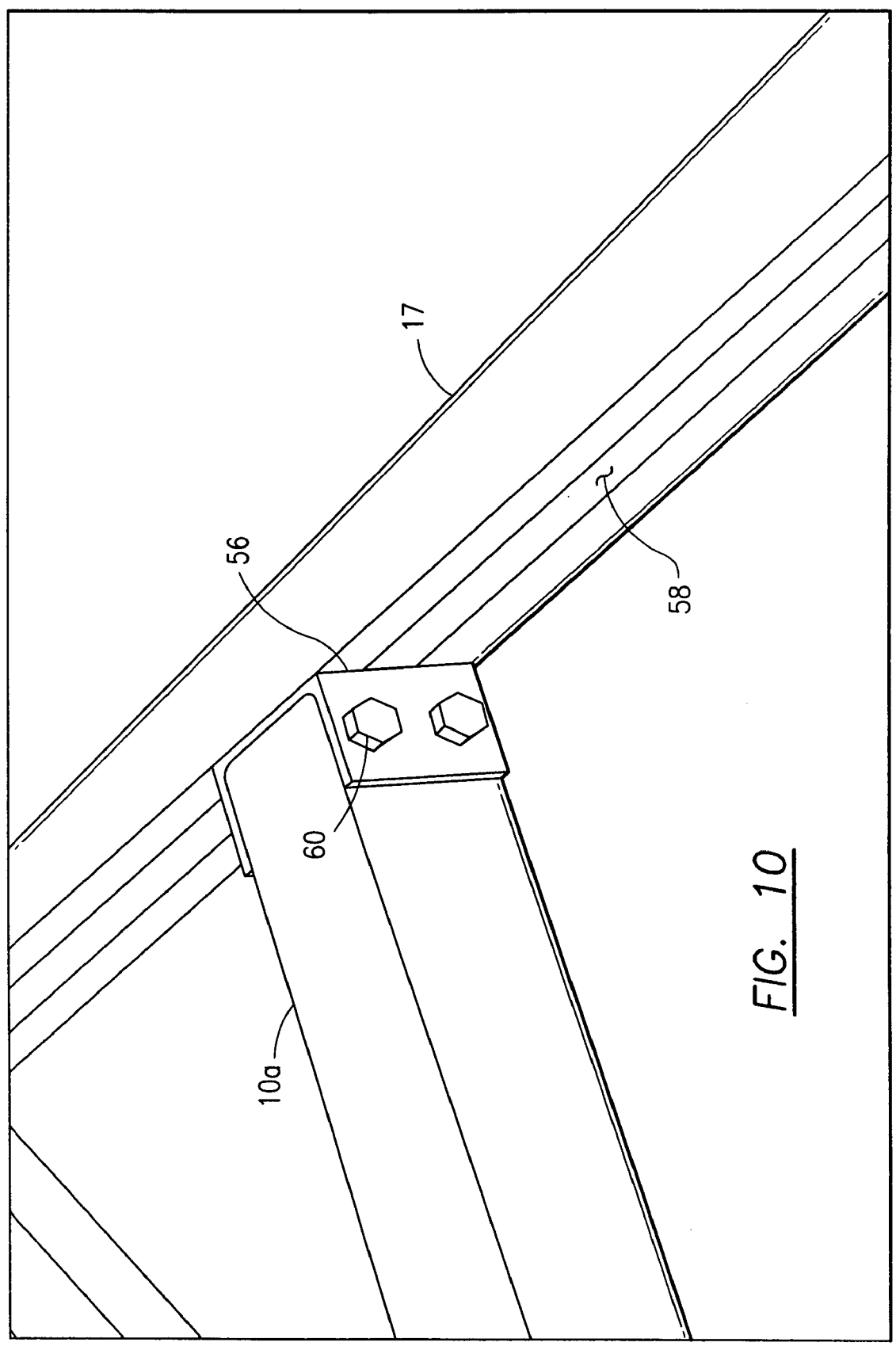

ALUMINUM TRAILER, FRAME AND KIT

This is a regular patent application based upon and claiming priority of provisional patent application Ser. No. 60/653,785 filed Feb. 17, 2005, now pending.

The present invention relates to an aluminum trailer frame, a trailer and a kit.

BACKGROUND OF THE INVENTION

Trailers regularly transport boats, watercraft, snowmobiles, all terrain vehicles, motorcycles or carry all trailer beds behind trucks and suitably configured automobiles. These trailers typically are 12 foot to 16 foot in length and include a pair of wheels set on axles and a brake light system as well as trailer accessories to secure the boat, watercraft, snowmobile or all terrain vehicle to the support elements on the trailer frame.

Typically, trailer frames have been made of galvanized steel. However, galvanized steel is heavy and although it is easy to assemble, the trailer, after assembly, must be sent to a galvanizing processor. These galvanizing processors adversely effect the environment, add to the cost of the galvanized trailer frame and significantly increase the time to manufacture trailers.

Therefore, there is a need for a light, easy to assemble, trailer frame.

OBJECTS OF THE INVENTION

It is an object of the present invention to provide a light, easy to assemble, aluminum trailer frame and an associated aluminum trailer for a boat, watercraft, snowmobile, all terrain vehicle (ATV), motorcycles or carry all trailer beds.

It is another object of the present invention to provide an aluminum trailer frame or an associated trailer wherein the side rails, cross members, bunk rail or beams, associated support members, runner plates, flat beds and beam supports, are sold as a kit to an assembler.

It is a further object of the present invention to provide an aluminum trailer frame and an associated trailer wherein the assembler can easily cut the side rails to configure a smaller sized trailer frame and associated trailer dependent upon the assembler's needs.

It is another object of the present invention to provide an aluminum trailer frame and an associated trailer wherein the cross members have C-shaped bolt head channels which (a) permit bolt heads to slide laterally across either a substantial length or the entire expanse of the cross members; and (b) locks the bolt head in the channel such that the bolt does not rotate.

SUMMARY OF THE INVENTION

The aluminum trailer frame and associated trailer includes first and second aluminum side rails with bowed forward sections adapted to converge on an aluminum trailer tongue beam. A plurality of aluminum cross members are laterally mounted to opposing side rails. Each cross member has a generally C-shaped cross section with an embedded, generally C-shaped bolt head channel near the mid-section of the C-shaped cross member. The channel has opposing tabs which rotatably trap a bolt head and the channel extends the substantial length of the cross members. A plurality of beam supports mount a load support system on the trailer frame. For boats, the load support is a pair of bunk rail beams supported by beam supports mounted above the cross members via bolts having bolt heads that are slidably disposed in the bolt head channels. Accessories are movably mounted on the cross members by bolts having bolt heads which are slidably disposed in the bolt head channels.

BRIEF DESCRIPTION OF THE DRAWINGS

Further objects and advantages of the present invention can be found in the detailed description of the preferred embodiments when taken in conjunction with the accompanying drawings in which:

FIG. 10 diagrammatically illustrates the bracket attachment for the tongue beam showing that the tongue bracket is adjustable laterally in the bolt head channel of the forward cross member;

DETAILED DESCRIPTION OF THE PREFERRED EMBODIMENTS

Figure 18:
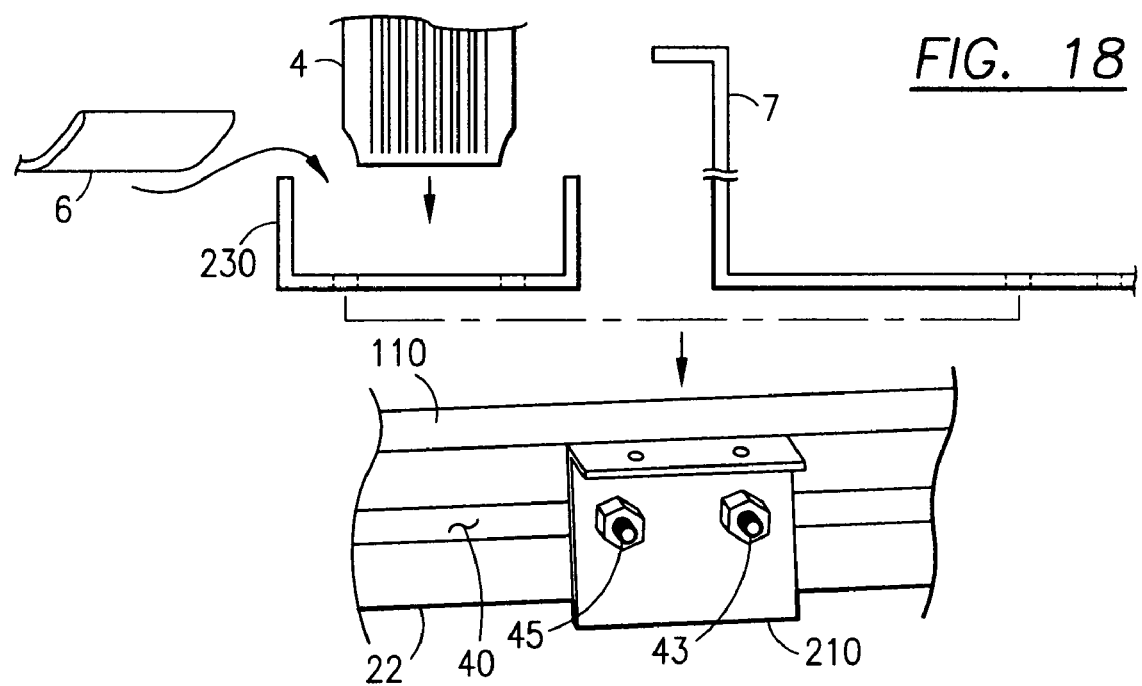
FIG. 18 diagrammatically shows an ATV wheel, a motorcycle wheel, a snow mobile ski and a carry all trailer flat bed with a beam support 210 movably mounted on a cross member.

The present invention relates to an aluminum trailer frame, an associated trailer, and a trailer frame kit for a boat, watercraft, snowmobile, all terrain vehicle (ATV), motorcycle or carry all trailer bed. Similar numerals designate similar items in the drawings. The boat is diagrammatically shown in FIG. 7 as hull 2, and motorcycle or ATV wheel 4, snow mobile ski 6 and flat bed trailer 7 is shown in FIG. 18.

Trailer 1 (FIG. 1) includes a tongue beam 10, bent side rails 14, 16 and cross members 18, 20, 22. Bunk rail members 24, 26 support a boat (not shown) which is placed atop the bunk rail members 24, 26. Wheels 28, 29 are rotatably attached with axles to side rails 14, 16. The bow of the boat, and particularly the bow hull portion, rests atop roller 30. See hull 2, FIG. 7, roller 30. Roller 30 is rotatably supported by roller assembly 32. The aft portion of tongue beam 10 is attached to cross member 17 as described later.

Figure 1:
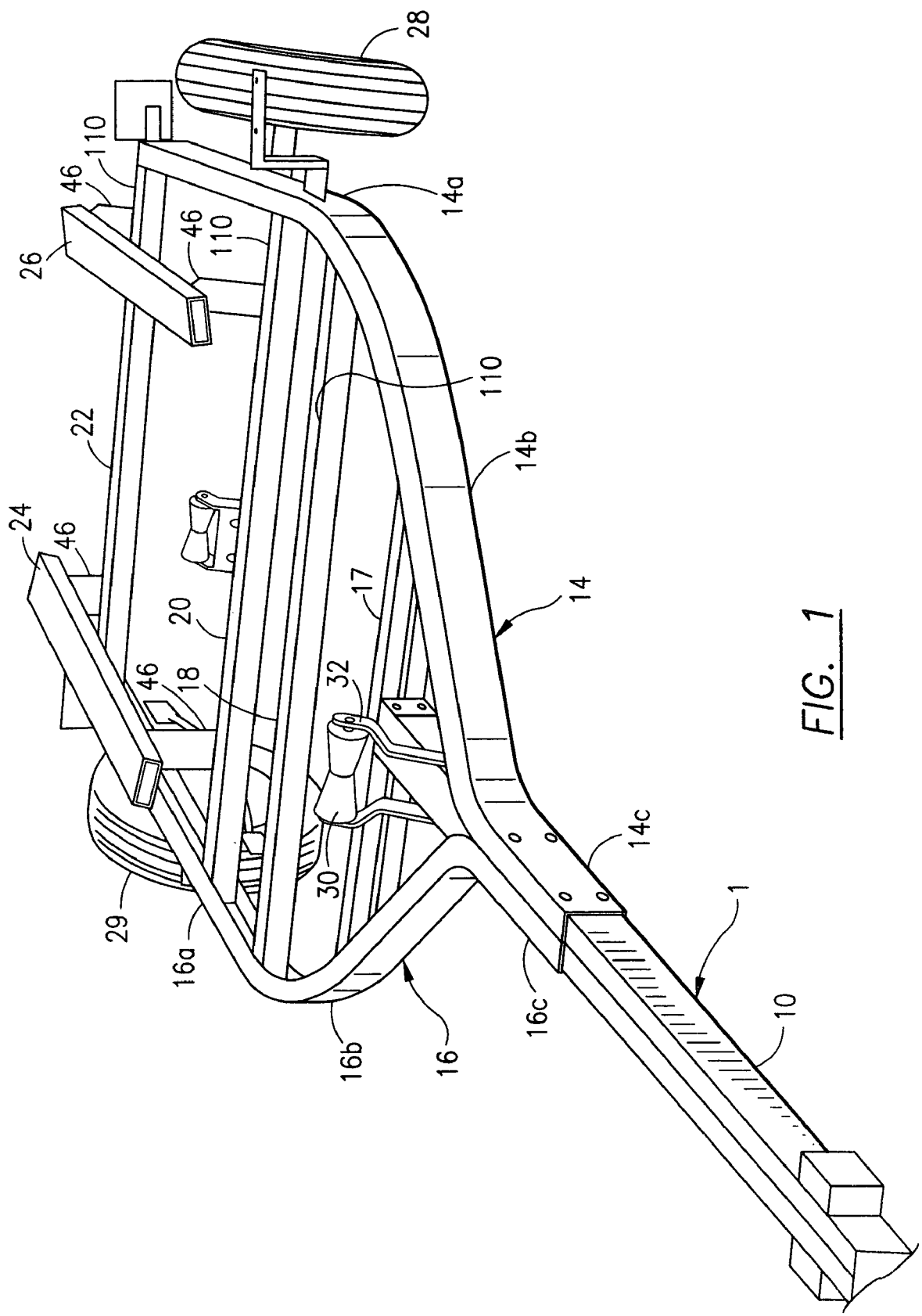
FIG. 1 diagrammatically illustrates an assembled aluminum trailer.

Although this detailed description discusses a trailer frame, an associated trailer, and a trailer frame kit used in connection with a boat trailer, the trailer system can be used in combination with snowmobile or an all terrain vehicle. For example, with respect to a snowmobile or an all terrain vehicle, or motorcycle (FIG. 18), U-shaped runner plates 230 are placed on the top surfaces 110 of cross members 18, 20, 22. Beam support 210 (FIG. 18), formed as L-shaped supports, are bolted to the cross members and to runner plates 230. Flat bed 7 is also bolted to beam support 210. As shown in FIG. 1, bunk rail supports 46 are provided to mount bunk rails 24, 26 above the top plane of the trailer, that is, above top surfaces 110 of cross members 18, 20, 22. The beam support fittings 46, when used in connection with a snowmobile or an all terrain vehicle, provide support fittings or beam supports (from the cross beams) which can be used to tie down the plate or board or runner or flat bed which is mounted atop surfaces 110 of cross members 18, 20, 22. See FIG. 18. Therefore, the cross members carry a plurality of laterally adjustable support fittings for boats, watercrafts, snowmobiles or all terrain vehicles, etc. and these fittings are laterally movably disposed on cross members 18, 20, 22. Of course, additional support fittings or beam supports may be mounted to the cross members dependent upon the need to securely support and tie down the boat, watercraft, snowmobile or all terrain vehicle on trailer 1.

Opposing side rails 14, 16 include straight sections 14a, 16a, bowed forward sections 14b, 16b and straight tip sections 14c, 16c. The straight tip sections 14c, 16c are bolted to tongue beam 10.

Figure 2:
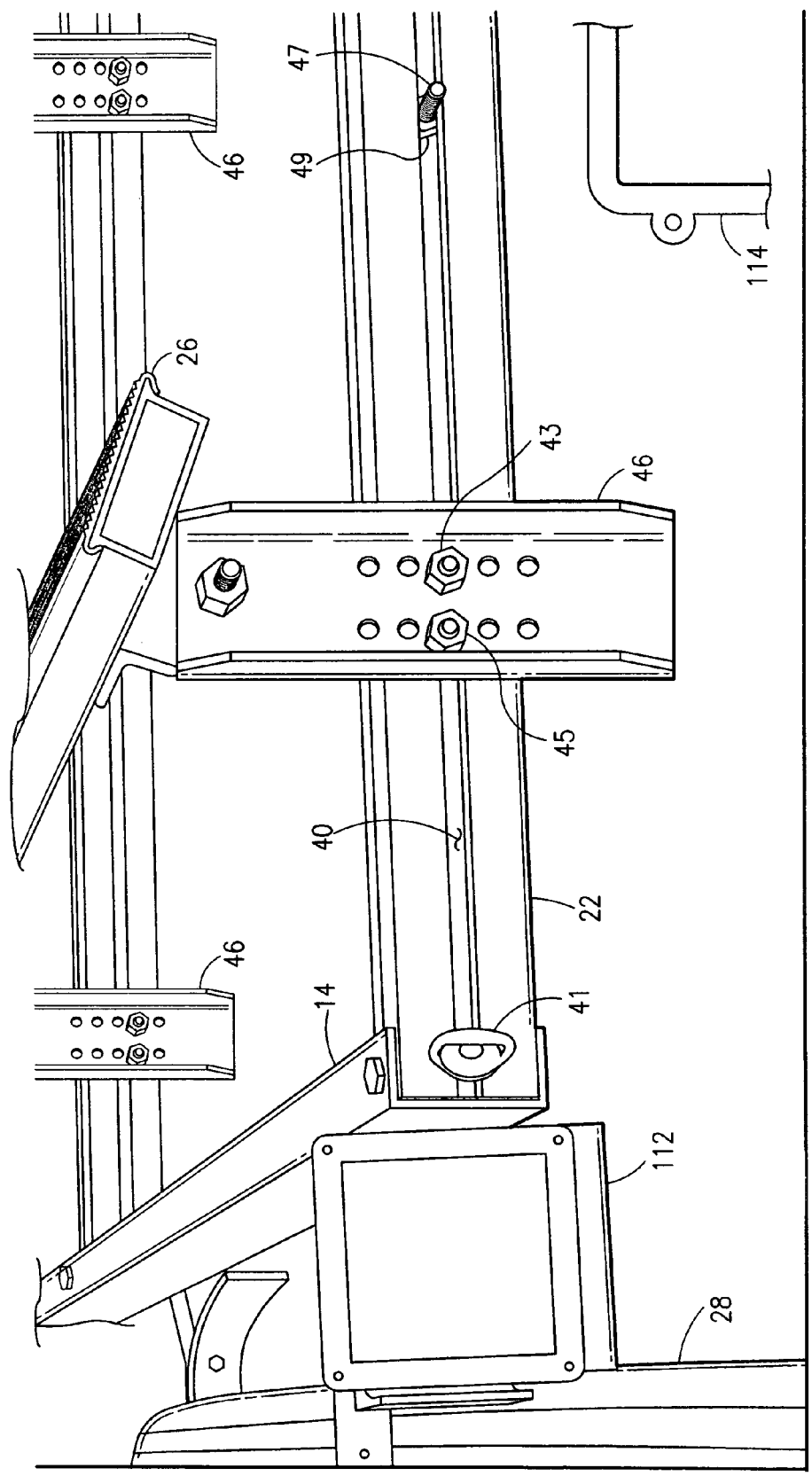
FIG. 2 diagrammatically illustrates a detail of the rearward cross member mounted to one side rail and a laterally adjustable support fitting (specifically, a bunk rail support) and showing a bolt with a bolt head movably disposed within the C-shaped bolt head channel of the cross member.

FIG. 2 shows rear cross member 22 having a bolt head channel 40 into which is slid a bolt head (not shown) for accessory cleat 41 and bolts 43, 45. The bolt and nut sets associated with bolts 43, 45 attach bunk rail support 46 at a selectable lateral location on cross member 22.

Bolt 47 has a bolt head 49 which is movably disposed in channel 40 of cross member 22. Each bolt is rotatably captured (prohibiting rotatable movement) in the bolt head channel but lateral positioning is permitted within the channel.

It is important to note that tongue beam 10, side rails 14, 16, and cross members 17, 18, 20, 22 are made entirely of aluminum. These trailer assembly elements are easy to assemble and lift or move compared with galvanized steel trailer frames. The bolts are stainless steel in order to reduce electrolysis chemical reaction. The trailer kit includes, in its most basic form, side rails 14, 16; two cross members 17, 22 tongue beam 10, tongue beam support bracket and a plurality of adjustable support fittings or beam supports (see brackets 46 or 210) for the carried the load.

Bolt head channel 40 extends substantially longitudinally throughout the length of cross member 22. Preferably, the channel runs the entire length of the channel. This is lateral with respect to the trailer frame work which frame work extends longitudinally to support the desired load. Therefore, the bunk beam support 46 or other support fittings (beam support 210) are completely laterally adjustable by loosening the nuts associated with nut and bolt sets 43, 45 and moving the support laterally to the desired position. A free floating bolt 47 is shown having bolt head 49 captured by the channel but laterally movably disposed in bolt head channel 40 of cross member 22.

Various trailer accessories can also be movably mounted on aft cross member 22. For example, tie off cleat fitting 41 is shown as movably mounted in bolt head channel 40. Light accessory 112 can also be movably mounted in aft cross member 22. License plate frame element accessory 114 can be movably mounted on boat 47 on cross member 22.

Figure 3A:
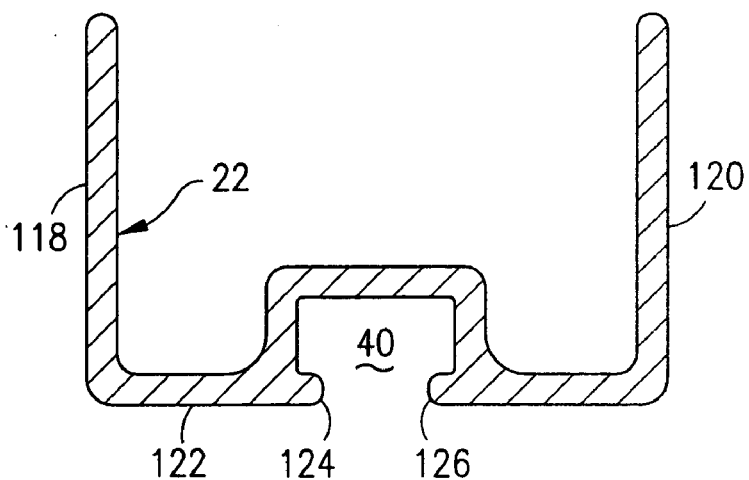
FIGS. 3A, 3B, 4A and 4B diagrammatically illustrate the cross members (C-shaped member and closed end C-shaped or rectangular member) and the bolt head channels in the base of the C-shaped configuration.
Figure 3B:
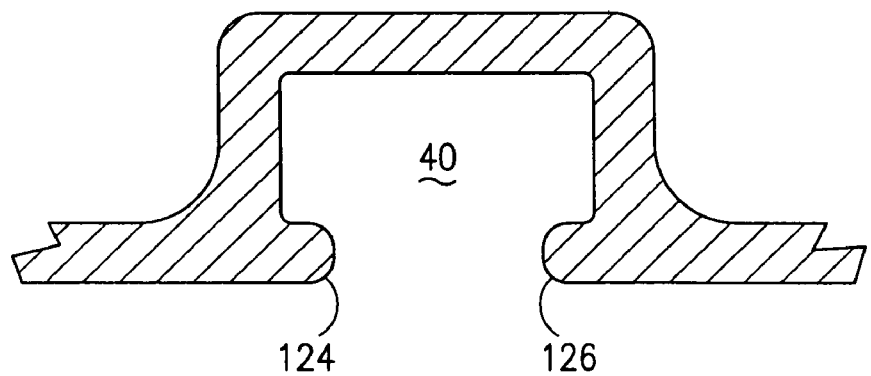
Figure 4A:
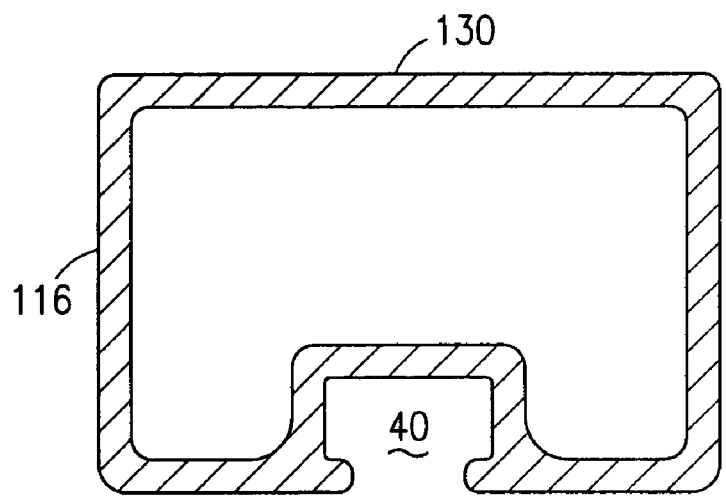
Figure 4B:
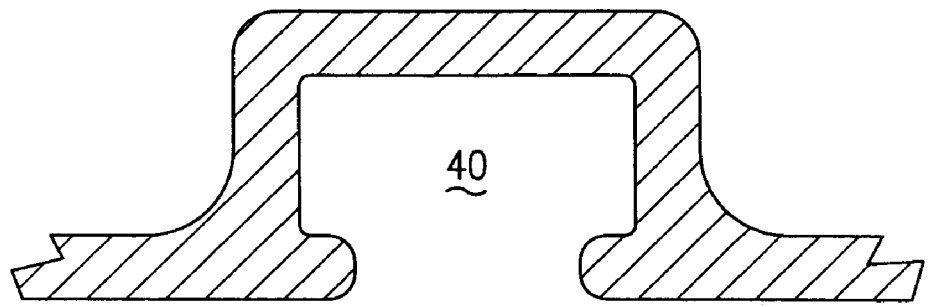

FIGS. 3A, 3B, 4A and 4B show cross sectional views of cross members (for example, member 22) and channel 40 within which the bolt heads for the various attached mechanisms can be placed. As shown in FIGS. 3A and 4A, the cross-members are either C-shaped 22 or rectangularly shaped member 116 (a closed C-shape with wall 130) with a bolt head channel 40 formed in one side thereof. It should be noted that closed C-shape cross member 116 in FIG. 4A may have two bolt head channels, one channel 40 as illustrated in FIG. 4A and a second bolt head channel on closing side 130. The closed C-shape cross member 116 (FIG. 4A) has greater strength than the open C-shaped member 22 (FIG. 3A).

Preferably, the cross members are generally C-shaped with an embedded C-shaped bolt head channel 40 located at or near mid-section of the base of the C-shaped cross member 22. FIG. 3A shows cross member 22 having opposing legs 118, 120 and base member 122. Base member 122 has formed, at or near its mid-section, a C-shaped bolt head channel 40. Bolt head channel 40 includes two opposing inwardly extending tabs 124, 126 which rotatably trap a bolt head 49 (FIG. 2) within the bolt head channel 40. The bolt head channel extends substantially along the length of the cross member. Therefore, since the cross member is laterally disposed between opposing side rails (see FIG. 1), any trailer accessory or support mechanism or beam support element disposed with bolts having bolt heads captured in these channels 40 is laterally movably disposed on the trailer 1. Once the nut and bolt system is secured in the bolt head channel with respect to any accessory or support member (the channel is sized to prohibit bolt rotation), the accessory support member is fixed at that lateral location on cross member 22. The dimensions shown in FIGS. 3A, 3B, 4A and 4B are examples of reasonable dimensions for these items. The bolt heads have flat sides which are trapped within channel 40.

If the designer wishes to improve the strength of cross members 18, 20, 22, FIG. 4A shows that the cross member may be a rectangularly shaped cross member 116. Effectively, the difference between C-shaped cross member in FIG. 3A and rectangular cross member in FIG. 4A is closure wall 130. The cross member in FIG. 4A may be square. Therefore, the cross member 116 in FIG. 4A is a C-shaped cross section with a closure wall 130. The closure wall 130 forms a rectangle or a square. C-shaped member in FIG. 4A with closure wall 130 still provides the same operational characteristics as cross members 18, 20, 22 but provides greater strength due to the presence of the bolt head channel due to closure wall 130. Additionally, closure wall 130 may include a second bolt head channel.

Figure 5:
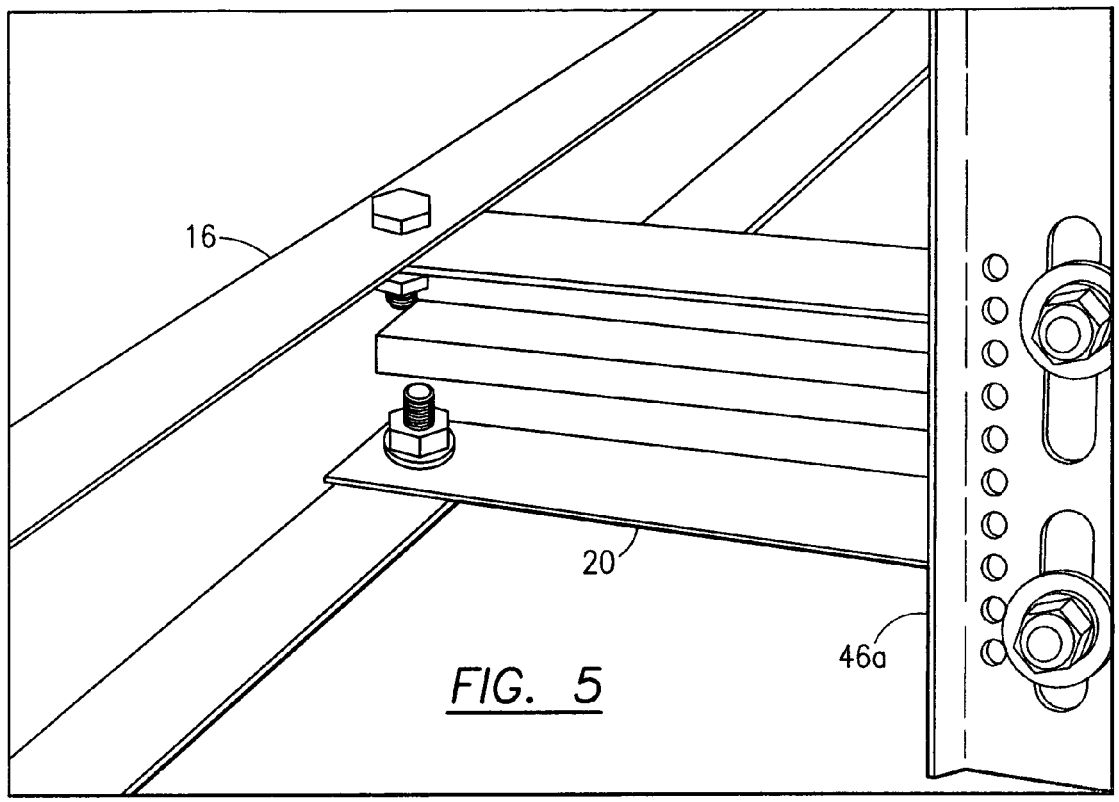
FIG. 5 diagrammatically illustrates a detailed view of a cross member mounted via bolts to a side rail and also shows a laterally adjustable support fitting for a boat, watercraft, snowmobile or all terrain vehicle.

FIG. 5 shows side rail 16 and mid-region or intermediate cross-member 20 bolted together. To assemble the aluminum trailer, the manufacturer simply determines where the cross-members should be longitudinally located based upon pre-drilled holes in side rails 14, 16. Stainless steel bolts are thereafter utilized to attach the cross members, such as cross member 20, to the side rails. In kit form, the side rails maybe pre-drilled. Additional cross members may be added by the trailer assembler by cutting the member to the correct size, drilling mount holes and mounting the member on side rails 14, 16.

As shown in FIG. 1, there are four cross members 17, 18, 20 and 22. One member may be omitted in a current, working embodiment. In general, cross members 18, 20 and 22 span opposing side rails 14, 16 between straight sections 14a, 16a. Forward most cross member 17 spans the opposing side rails 14, 16 at curved or bowed sections 14b, 16b.

FIG. 5 also shows adjustable support fitting 46a.

Figure 6:
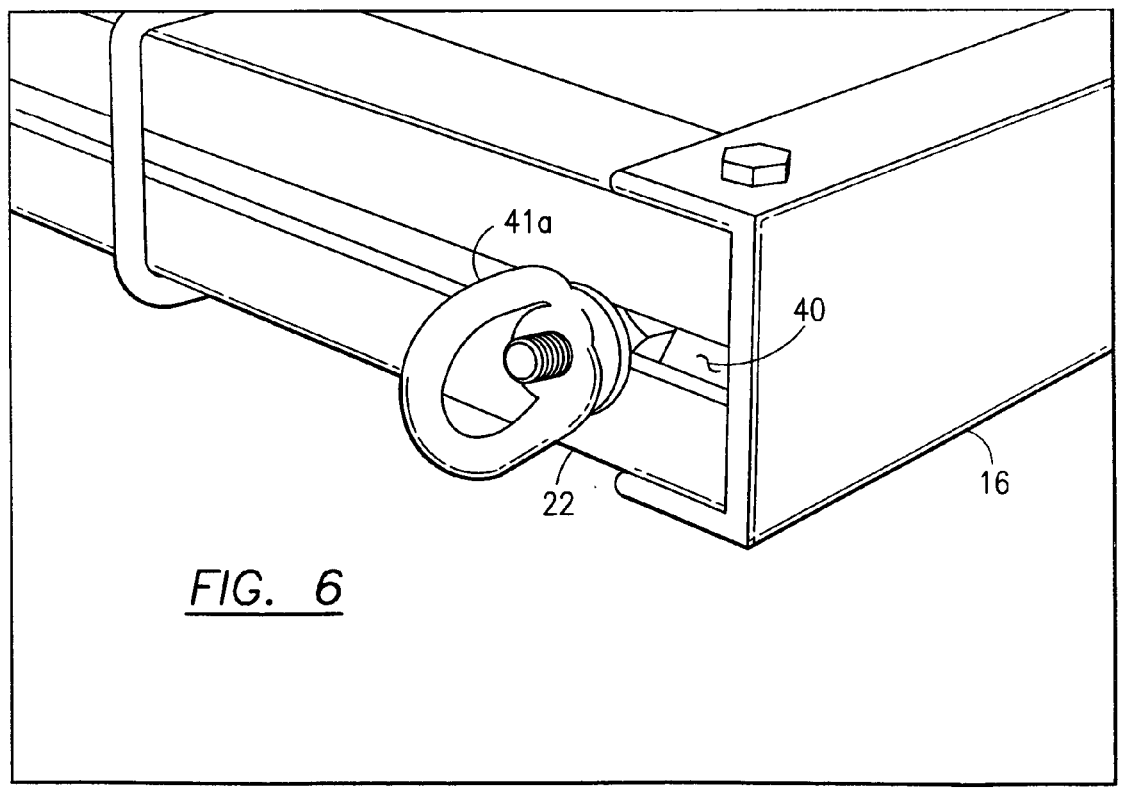
FIG. 6 diagrammatically illustrates a trailer accessory attached to a cross member via a bolt having a bolt head movably disposed within the bolt head channel of the cross member.

FIG. 6 shows that accessory tie off cleat 41a can be positioned at various lateral trailer locations due to its attachment bolt position in bolt head channel 40 of cross-member 22. This greatly enhances the ability of the manufacturer and also the user to position cleat 41 (FIG. 2) and 41a (FIG. 6) at desirable locations on cross member 22. Further, the user and/or the manufacturer can put a plurality of cleats in any one of cross-members 17, 18, 20, 22 since all the cross members have the bolt head channels which extend throughout the longitudinal extent of a cross member. Light mounts (for lighting systems) and sub-system support elements may be mounted via bolt attachments in channel 40.

Figure 7:
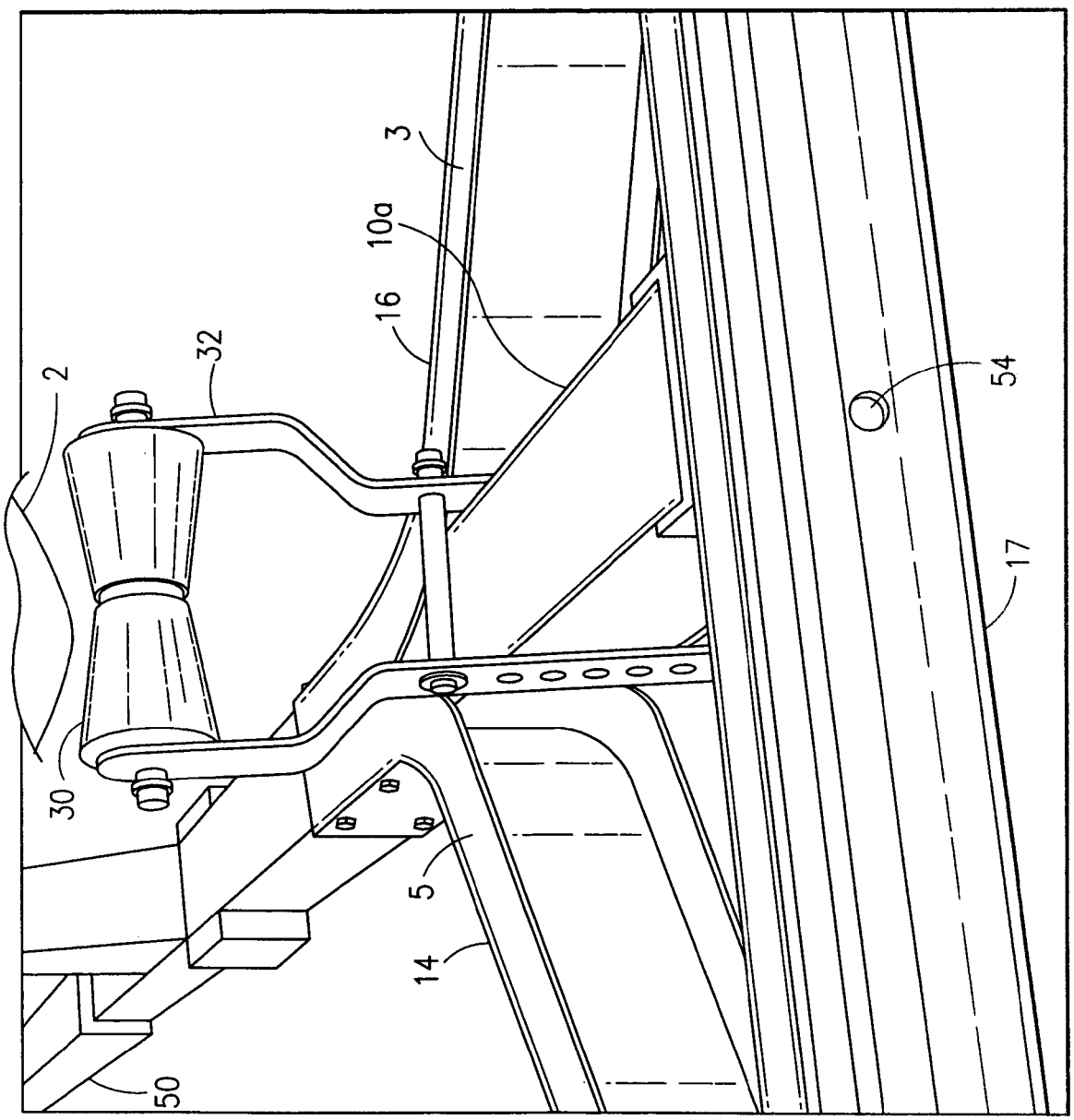
FIG. 7 diagrammatically illustrates the tongue of the trailer frame, trailer and kit with a keel roller and keel roller support mounted to the tongue and also schematically shows boat hull 2.

FIG. 7 diagrammatically shows tongue beam 10a mounted to forward cross member 17. Side rails 14, 16 have upper surfaces 3, 5 which include a plurality of ridges (serrations) such that the user does not slip on surfaces 3, 5 and the ridges form a grip surface. Also, side rails 14, 16 are bolted at a convenient location on tongue 10a. In addition, bow roller support 32 can be positioned at an appropriate location based upon the desires of the manufacturer/assembler forward and aft along tongue 10a. This is accomplished by an over and under mount system about tongue 10a.

Figure 8:
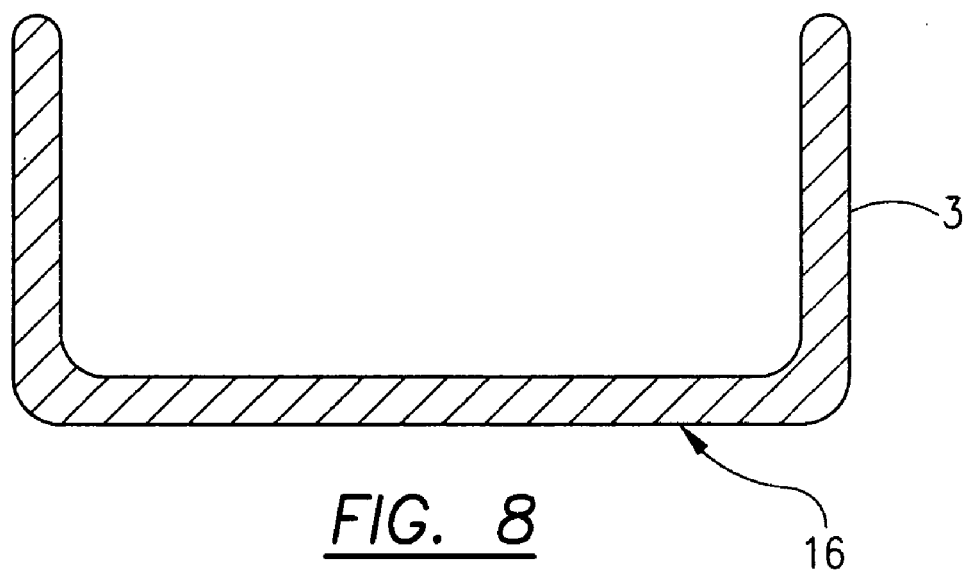
FIG. 8 diagrammatically illustrates a cross sectional view of the C-shaped side rail.

FIG. 8 diagrammatically shows a cross-section of the side rail and also shows the serrated or grooved surface 3 on the side rail.

Figure 9:
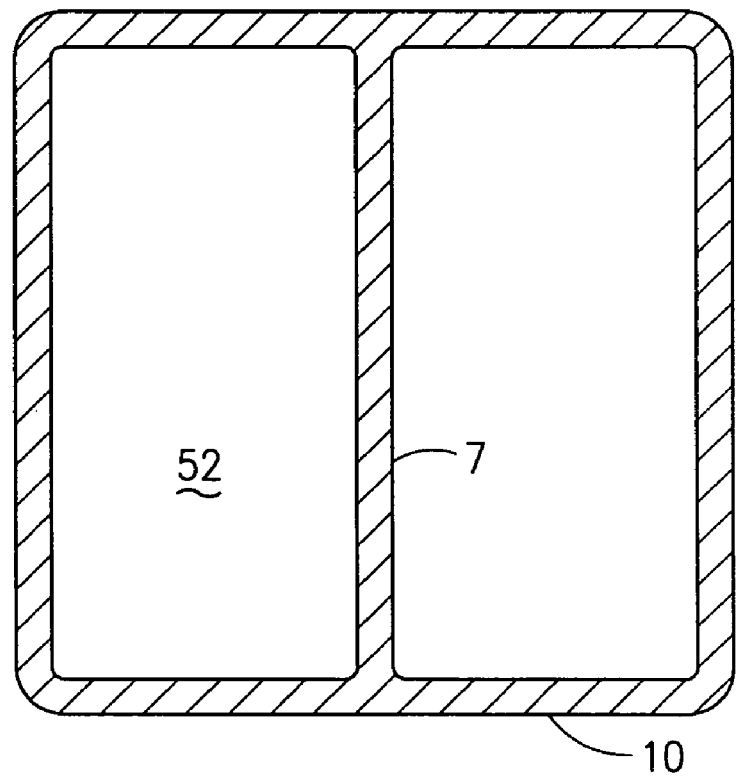
FIG. 9 diagrammatically illustrates a cross sectional view of the tongue beam.

FIG. 9 shows a cross-section of tongue 10 which is generally square or rectangular in shape with a mid-section support 7.

Wires for electrical connections between the towing vehicle and the trailer lights (FIG. 2) can be run by the manufacturer or assembler by feeding wires from the fore end 50 (FIG. 7) of tongue 10a through open region 52 (FIG. 9) of the tongue and drilling a hole 54 through forward cross member 17.

FIG. 10 shows forward cross member 17 and the tongue bracket 56 attaching tongue bar beam 10a to cross member 17. The position of tongue support bracket 56 is laterally adjustable because cross member 17 includes bolt channel 58 which is substantially identical to bolt channel 40 in aft cross member 22. Further, all the cross members 17, 18, 20, 22 have bolt channels which permits manufacturer/assembler as well as the user to add cleats, adjust the lateral position of any supports, for example bunk supports 46, as well as add or move other items on the trailer frame.

Returning to FIG. 10, tongue support bracket (C-shaped) 56 is placed at the appropriate position laterally on cross member 17 and one and preferably two bolts are utilized extending from bolt channel 58 into the interior portion of tongue support 56. After tongue support bracket 56 is attached to cross member 17, tongue 10a is placed in U-shaped or C-shaped tongue support 56 and two bolts are utilized to mount tongue 10a to the tongue support 56. Bolt 60 is one of the two bolts.

Figure 12:
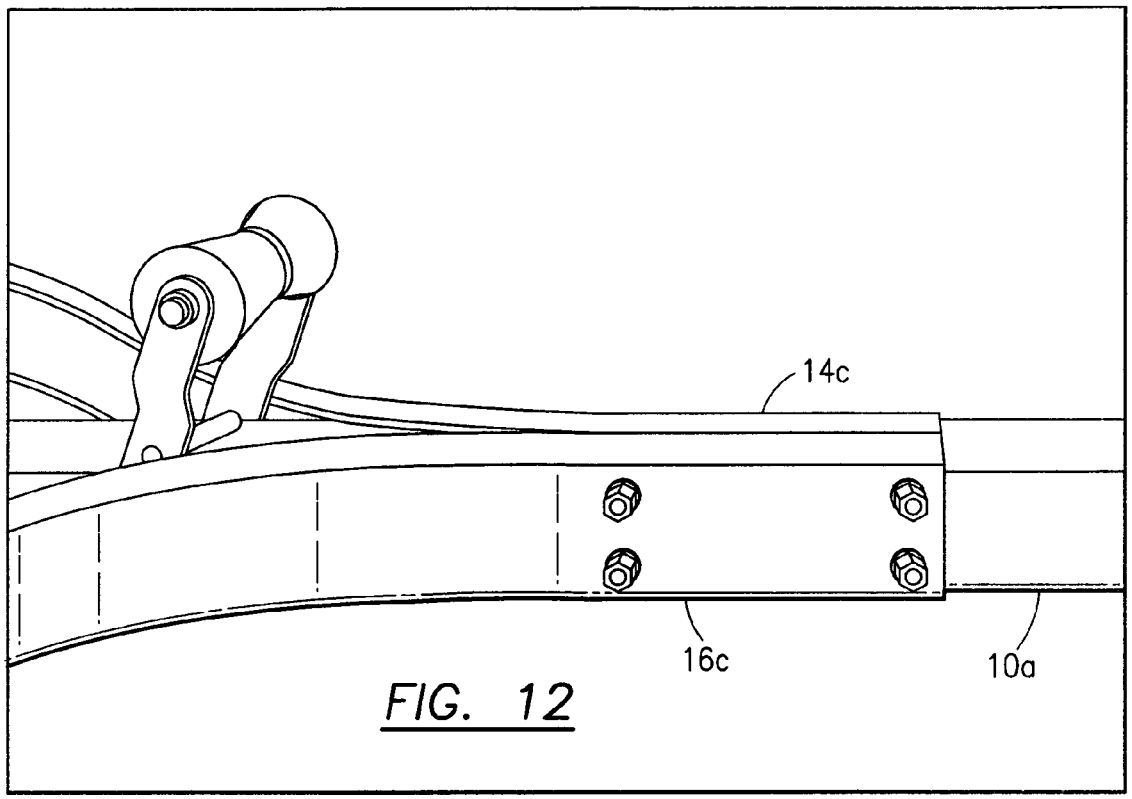
FIG. 12 diagrammatically illustrates the straight tip section of the side rails attached to the tongue beam.
Figure 11:
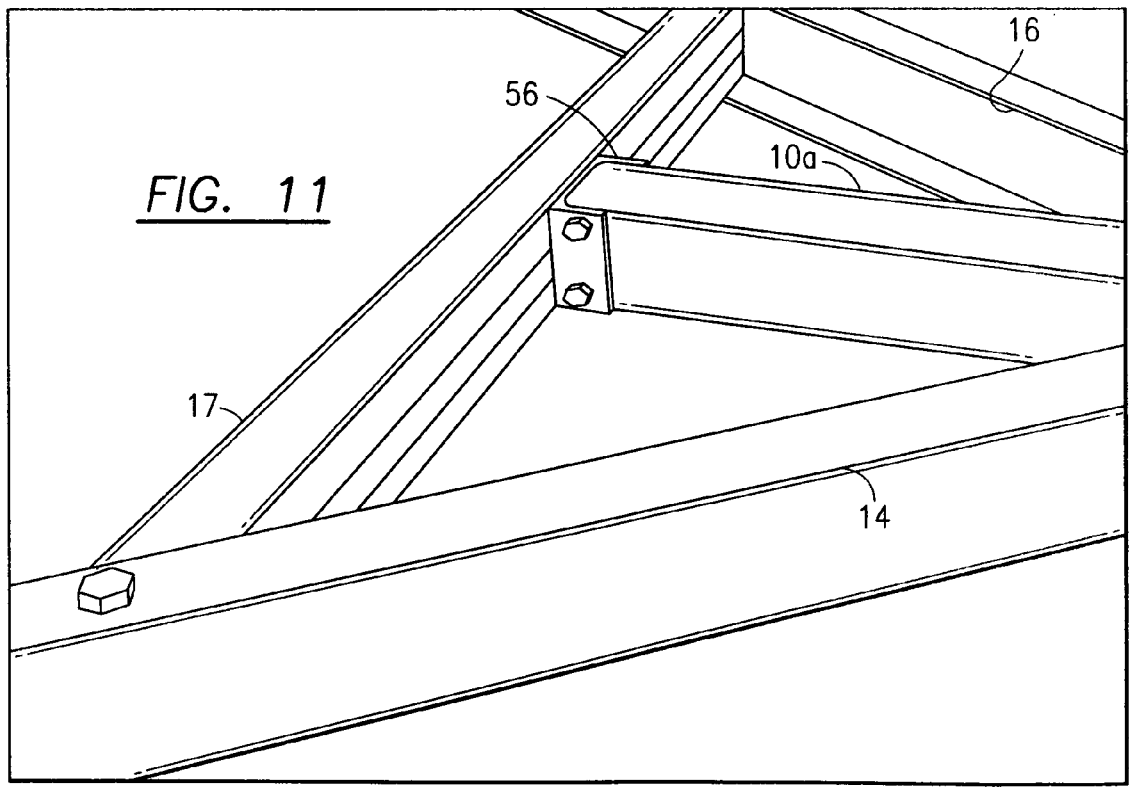
FIG. 11 diagrammatically illustrates the forward cross member, the tongue beam, the tongue bracket, and the bowed forward section of the side rails.

FIG. 12 shows tongue 10a as being attached to side rails 14, 16 (specifically straight tip sections 14c, 16c). FIG. 11 shows tongue 10a being attached via tongue bracket 56 to forward cross-member 17.

Figure 13:
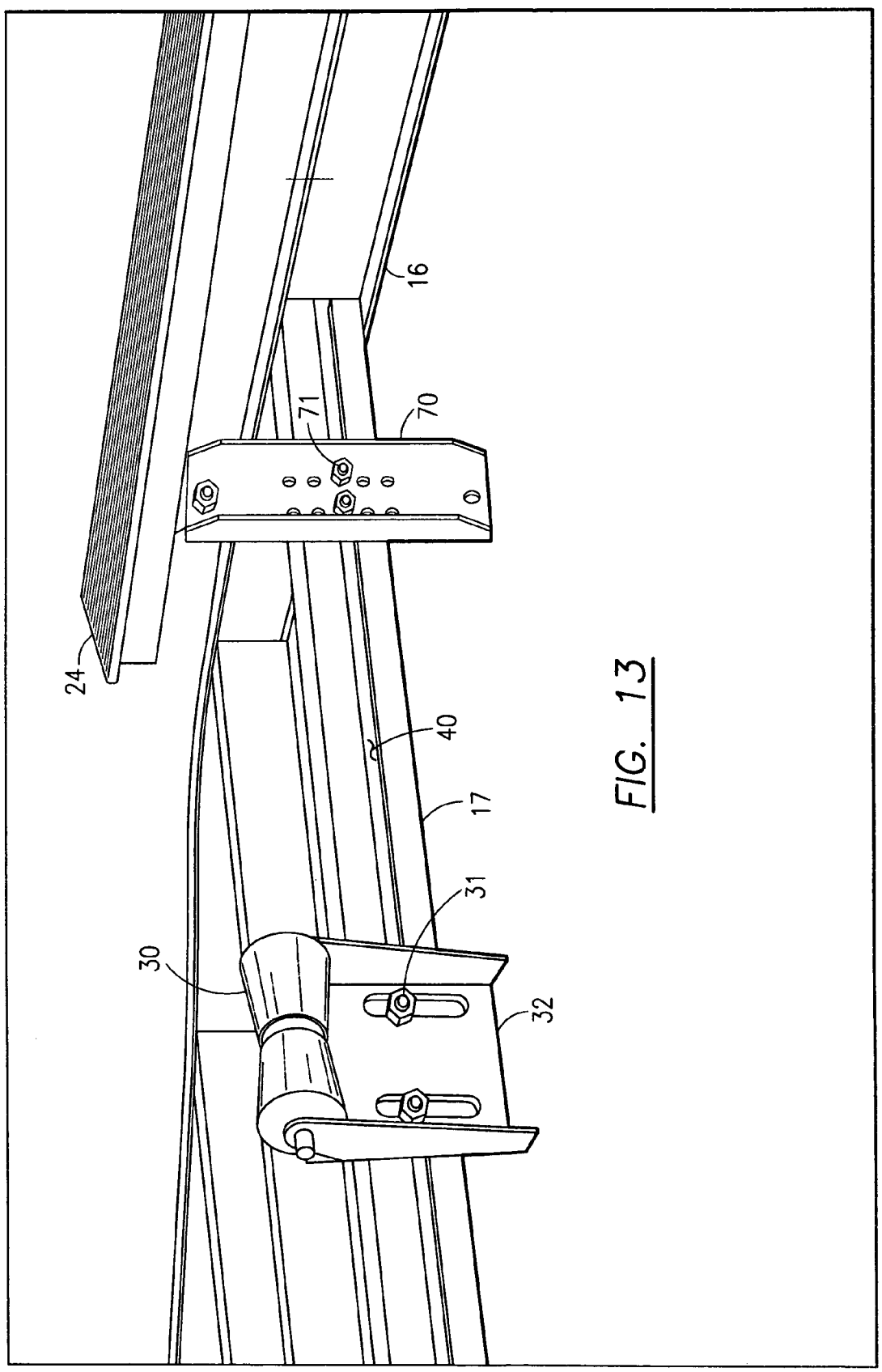
FIG. 13 diagrammatically illustrates the bunk rail supports and one of the bow keel rollers and roller support attached to the cross member.

FIG. 13 shows bunk rail 24 attached to cross member 17 by forward bunk bracket support 70. Support 70 is sometimes referred to as a beam support for a load. The height of bunk rail or beam 24 can be adjusted by the manufacturer (trailer assembler) or the user by selecting the appropriate vertical hole or through passage in bunk support 70. Further, bunk rail 24 can be adjusted laterally along the length of cross member 17 by loosening bolt 71 and sliding the bunk support 70 laterally (longitudinally along the cross member 17) in bolt channel 40. In a similar manner, bow roller 30 can be adjusted vertically by loosening, moving and the tightening bolts 31 in the roller support bracket 32. Also, roller 30 can be adjusted laterally on the trailer by loosening the bolt 31 and sliding the roller support 32 longitudinally in bolt channel 40.

Figure 14:
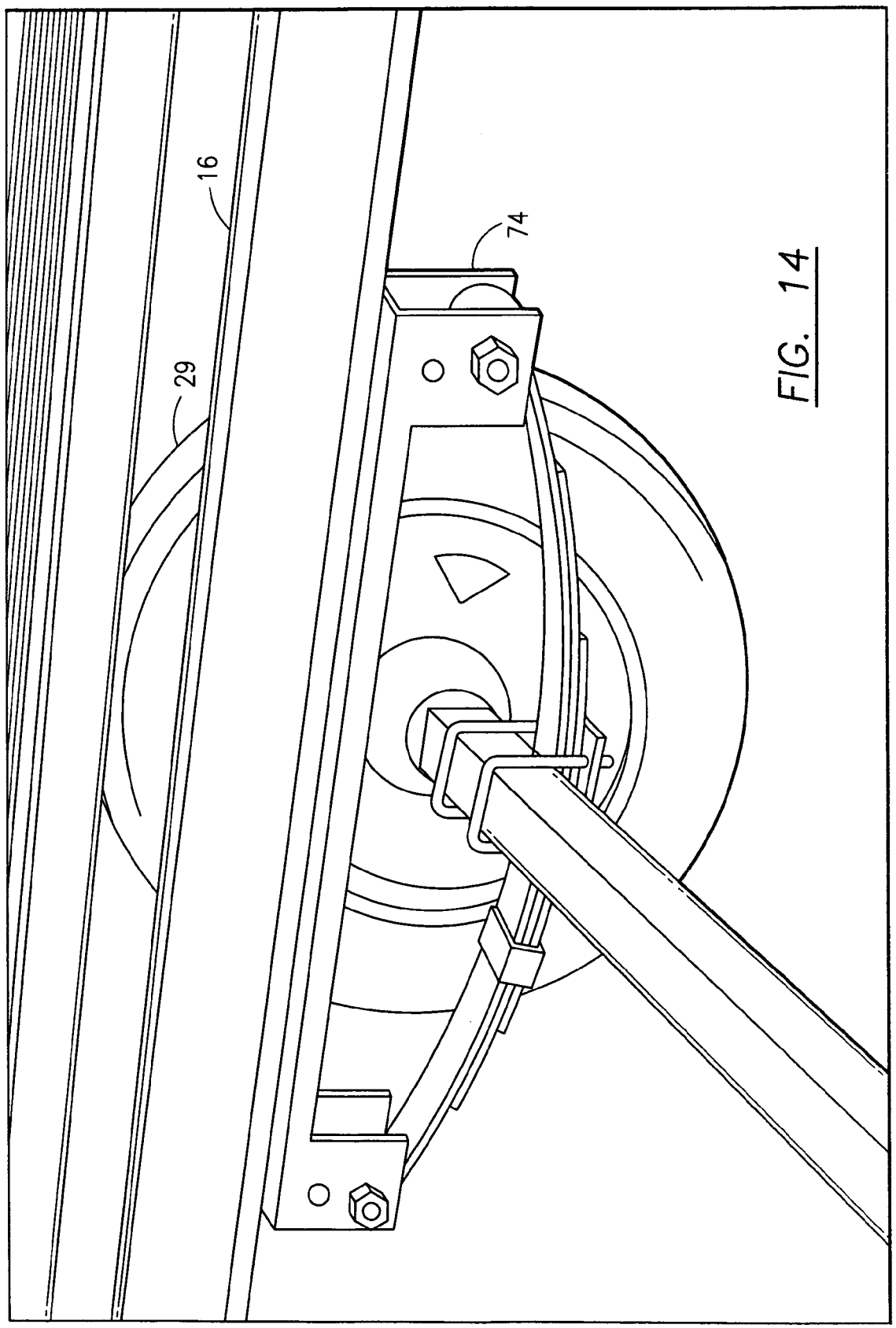
FIG. 14 diagrammatically illustrates a wheel-axle-leaf spring assembly attached to and mounted to the side rail.

FIG. 14 diagrammatically shows wheel 28 attached via wheel support bracket 74 (and associated leaf spring) to side rail 16. Wheel 29 is rotatably mounted in this manner to the trailer frame and wheel 29 is associated with an axle (not shown). In kit form, the wheel, axle and leaf spring sub-assembly is separately sold apart from the trailer frame.

Figure 15:
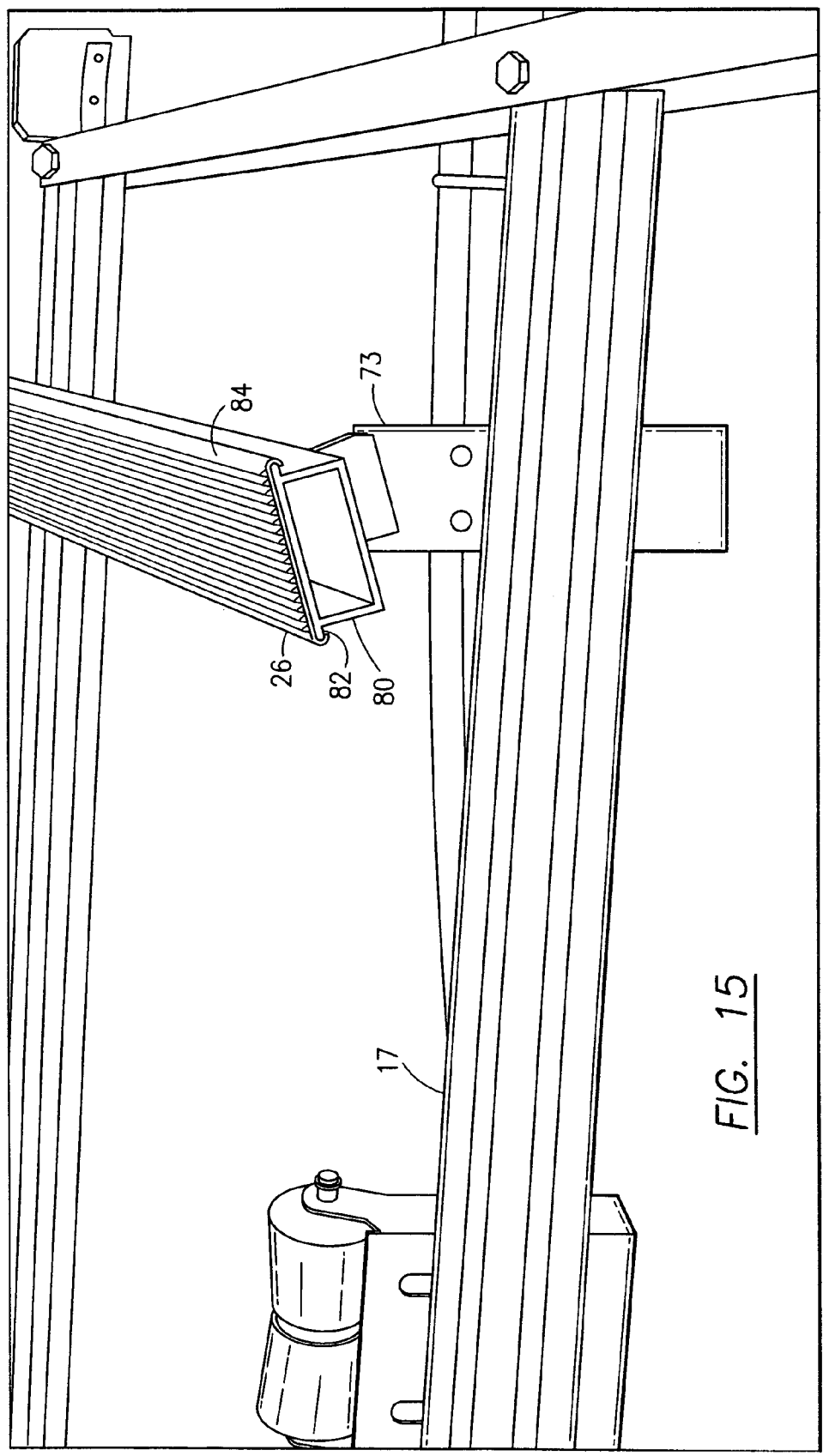
FIG. 15 diagrammatically illustrates the side rail, and two attached cross members and the bunk rail and bunk rail support.

FIG. 15 diagrammatically shows that the bunk rails consist of a generally rectangular aluminum tube 80, a flange portion that extends laterally beyond the rectangular tube top surface, identified as flange 82, and a plastic or rubber cushion member 84 mounted on the flange. Plastic member 84 has opposing, facing, U-shaped channels which mate over and capture the flanges 82 which extend on either side of rectangular aluminum support 80.

It should be noted that the length of the bunk rails can be adjusted and mounted on any one of the cross members 17, 18, 20 dependent upon the need of the manufacturer/assembler and/or the user. The benefit of using aluminum is light weight, easy construction, lower cost as compared to galvanized steel, and permits all parts of the trailer to be cut, bent and shipped as a kit to the assembler/manufacturer. For example, a 16 foot trailer kit can be cut down to a 12 foot trailer by trimming 1 foot from the tongue beam and one foot from the side rails. The assembler could simply assemble the miscellaneous pieces such as tongue 10, side rails 14, 16, cross-members 17, 18, 20, 22 and bunk rails 24, 26. The wheels, leaf springs, bearings and axle can also be sold as a sub-system kit in addition to bow roller 30 and intermediate bow roller (see FIG. 1, unnumbered) as well as roller support 32 and intermediate roller support. Beam supports 70, 210, bunk rails 24, flat bed 7, runner plates 230 may be part of the kit. The assembler may also cut various cross pieces and the side rails to the appropriate length. Therefore, a 14 foot trailer kit may be cut down to a 12 foot trailer. Supports or brackets are sold separately.

Figure 16:
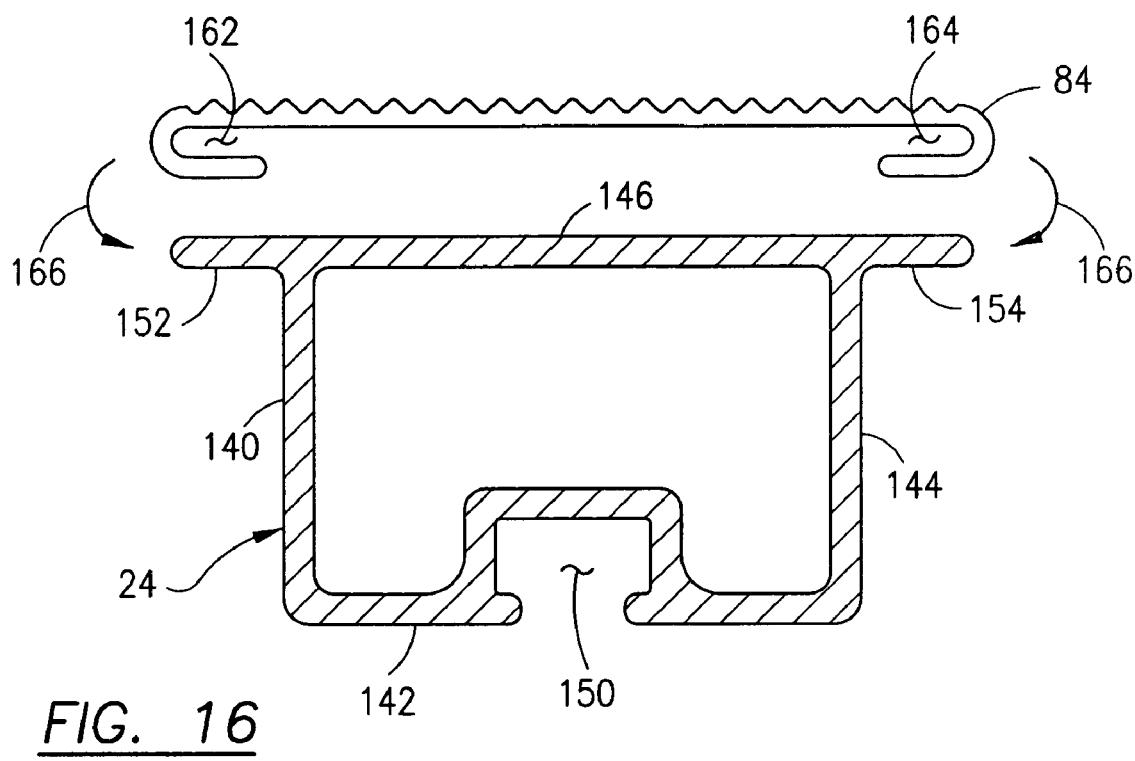
FIG. 16 diagrammatically illustrates a cross section of an alternative bunk rail, the bolt head channel in the bunk rail, and the vinyl or plastic covering mounted on the top surface of the bunk rail.

FIG. 16 shows an alternative embodiment for bunk rail 24. Bunk rail 24 in FIG. 16 includes a generally rectangular or enclosed structure having sides 140, 142, 144 and 146. Disposed at or near the mid-section of base 142 is a bolt head channel 150. Bolt head channel 150 operates in substantially the same manner as the bolt head channel discussed above in connection with the cross members. Enclosing side 146 includes outwardly extending flanges 152, 154. These flanges are adapted to fit within slots 162, 164 of plastic or rubber member 84. The item carried by the trailer rests atop cover member 84. Arrows 166 show the attachment mechanism.

Figure 17:
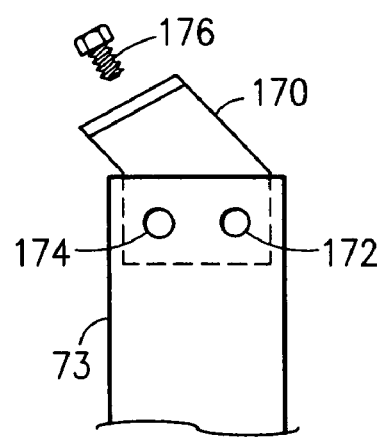
FIG. 17 diagrammatically illustrates a bunk beam support and the bolt having a bolt head which enables the support to be movably disposed within the bolt head channel of the bunk beam.

FIG. 17 shows bunk support 13 with auxiliary bracket 170. Bracket 170 is attached to bunk support 73 via nut and bolt systems 172, 174. The auxiliary bracket 170 includes a bolt 176 with a bolt head adapted to be disposed in bolt head channel 150 of bunk rail 24.

FIG. 18 shows wheel 4 or sled ski 6 adapted to be supported as a trailer load in open top U-shaped runner plate 230 which is bolted via bolts (not shown) operating in through holes, in the plate 230 and inverted L-shaped beam support 210. Multiple runners 230 and beam supports 210 are used as needed. Otherwise, the trailer becomes a carry all trailer with flat bed 7 bolted to beam support 210. The flat plate lateral extension of inverted L-shaped beam support 210 is co-extensive with the plane of top surface 110 of cross member 22.

The claims appended hereto are meant to cover modifications and changes within the scope and spirit of the present invention.

What is claimed is:

1. An aluminum trailer frame for a boat, watercraft, snowmobile, all terrain vehicle, motorcycle or carry all trailer bed comprising:

first and second aluminum side rails each having a straight section and a bowed forward section leading to a straight tip section, said forward bowed section of said first side rail formed to converge with the forward bowed section of said second side rail, each said side rail having a C-shaped cross section;

at least two elongated, generally linear aluminum cross members, each cross member having a generally C-shaped cross section with an embedded generally C-shaped bolt head channel located at or near a midsection of said C-shaped cross member, said C-shaped bolt head channel including opposing tabs which trap a bolt head in said bolt head channel, said bolt head channel extending a substantial length of said cross members;

said cross members laterally mounted on longitudinally disposed opposing side rails thereby forming an open framework for said trailer;

a load support system for said boat, watercraft, snowmobile, all terrain vehicle, motorcycle or carry all trailer bed including at least two beam supports mounting said load support system to said trailer, said beam supports movably mounted on said cross members via a plurality of bolts having bolt heads slidably disposed in said bolt head channels such that said beam supports are movably adjustable to accommodate said at least one of said boat, watercraft, snowmobile, all terrain vehicle, motorcycle or carry all trailer bed;

wherein said pair of cross members are a rear cross member and a forward cross member, said rear cross member disposed at a rearward position spanning said opposing side rails and said forward cross member disposed at a forward position relative to said rear cross member between opposing side rails;

said bunk beams are elongated beams, each bunk beam having a generally rectangular cross section and having, at or near a midline of one wall forming said rectangular cross section a bunk beam C-shaped bolt head channel with a opposing tabs which trap a bolt head in said bolt head channel, said beam supports each having an L-shaped bracket carrying a bunk beam bolt and a bunk beam bolt head, said bunk beam bolt head slidably disposed in said bunk beam bolt head channel thereby permitting said bunk beams to move forward and aft on said beam supports due to the sliding of bolt heads in said bunk beam bolt head channels.

2. An aluminum trailer frame as claimed in claim 1 wherein said load support system includes a load support from the group of load supports including two bunk beams adapted to support said boat or watercraft, open top U-shaped runner plates adapted to support said snowmobile or motorcycle, a flat bed adapted to support said all terrain vehicle and a shallow trailer bed.

3. An aluminum trailer frame as claimed in claim 1 wherein each of said at least two beams supports includes a vertical plate through which passes said plurality of bolts for movable attachments to said cross members.

4. An aluminum trailer frame as claimed in claim 1 including an elongated aluminum tongue beam, said straight tip sections of said side rails mounted to said tongue beam and said tongue beam extending forward beyond said straight tip sections.

5. An aluminum trailer frame as claimed in claim 1 said trailer frame including trailer accessories movably disposed by accessory bolts having accessory bolt heads slidably mounted in said bolt head channel of said rear cross member.

6. An aluminum trailer frame as claimed in claim 5 wherein said trailer accessories include tie-off cleat fittings, lights and license plate frame elements.

7. An aluminum trailer frame as claimed in claim 1 wherein said trailer frame is configured for a boat or watercraft and including a forward and an aft keel roller and respective roller support plates for said forward and aft keel rollers, said roller support plates being movably mounted by keel support bolts having keel support bolt heads which are slidably retained in said bolt head channels of said cross members, said load support system including a pair of bunk beams to support said boat or watercraft, said bunk beams attached to said beam supports.

8. An aluminum trailer frame as claimed in claim 1 including a third cross member with a respective bolt head channel extending the length of said cross member, said cross members respectively mounted and disposed at a rearward, an intermediate and a forward position relative to the opposing first and second side rails.

9. An aluminum trailer frame as claimed in claim 2 wherein said pair of cross members are a rear cross member and a forward cross member, said rear cross member disposed at a rearward position spanning said opposing side rails and said forward cross member disposed at a forward position relative to said rear cross member between opposing side rails; said trailer frame including trailer accessories movably disposed by accessory bolts having accessory bolt heads slidably mounted in said bolt head channel of said rear cross member.

10. An aluminum trailer frame as claimed in claim 9 wherein said trailer accessories include tie-off cleat fittings, lights and license plate frame elements.

11. An aluminum trailer frame as claimed in claim 10 including a third cross member with a respective bolt head channel extending the length of said cross member, said third cross member mounted between said opposing side rails at an intermediate position relative to said rear and forward cross members.

12. An aluminum trailer for a boat, watercraft, snowmobile, all terrain vehicle, motorcycle or carry all trailer bed comprising:
- first and second aluminum side rails each having a straight section and a bowed forward section leading to a straight tip section, said forward bowed section of said first side rail formed to converge with the forward bowed section of said second side rail, each said side rail having a C-shaped cross section;
- at least two elongated, generally linear aluminum cross members, each cross member having a generally C-shaped cross section with an embedded generally C-shaped bolt head channel located at or near a midsection of said C-shaped cross member, said C-shaped bolt head channel including opposing tabs which trap a bolt head in said bolt head channel, said bolt head channel extending a substantial length of said cross members;
- said cross members laterally mounted on longitudinally disposed opposing side rails thereby forming an open framework for said trailer;
- a load support system for said boat, watercraft, snowmobile, all terrain vehicle, motorcycle or carry all trailer bed including at least two beam supports mounting said load support system to said trailer, said beam supports movably mounted on said cross members via a plurality of bolts having bolt heads slidably disposed in said bolt head channels such that said beam supports are movably adjustable to accommodate said at least one of said boat, watercraft, snowmobile, all terrain vehicle, motorcycle or carry all trailer bed; and
- a pair of wheels rotatably mounted to an axle, said axle mounted to said side rails;
- said load support system including a pair of bunk beams attached to said beam supports, said bunk beams are elongated beams, each bunk beam having a generally rectangular cross section and having, at or near a midline of one wall forming said rectangular cross section a bunk beam C-shaped bolt head channel with a opposing tabs which trap a bolt head in said bolt head channel, said beam supports each having an L-shaped bracket carrying a bunk beam bolt and a bunk beam bolt head, said bunk beam bolt head slidably disposed in said bunk beam bolt head channel thereby permitting said bunk beams to move forward and aft on said beam supports due to the sliding of bolt heads in said bunk beam bolt head channels.

13. An aluminum trailer as claimed in claim 12 including an elongated aluminum tongue beam, said straight tip sections of said side rails mounted to said tongue beam and said tongue beam extending forward beyond said straight tip sections.

14. An aluminum trailer as claimed in claim 12 wherein said pair of cross members are a rear cross member and a forward cross member, said rear cross member disposed at a rearward position spanning said opposing side rails and said forward cross member disposed at a forward position relative to said rear cross member between opposing side rails; said trailer frame including trailer accessories movably disposed by accessory bolts having accessory bolt heads slidably mounted in said bolt head channel of said rear cross member.

15. An aluminum trailer as claimed in claim 14 wherein said trailer accessories include tie-off cleat fittings, lights and license plate frame elements.

16. An aluminum trailer as claimed in claim 12 wherein said trailer frame is configured for a boat or watercraft and including a forward and an aft keel roller and respective roller support plates for said forward and aft keel rollers, said roller support plates being movably mounted by keel support bolts having keel support bolt heads which are slidably retained in said bolt head channels of said cross members, said a pair of bunk beams to support said boat or watercraft.

17. An aluminum trailer as claimed in claim 12 including a third cross member with a respective bolt head channel extending the length of said cross member, said cross members respectively mounted and disposed at a rearward, an intermediate and a forward position relative to the opposing first and second side rails.

18. A kit of parts for an aluminum trailer frame for a boat, watercraft, snowmobile, all terrain vehicle, motorcycle or carry all trailer bed comprising:
- first and second aluminum side rails each having a straight section and a bowed forward section leading to a straight tip section, said forward bowed section of said first side rail formed to converge with the forward bowed section of said second side rail, each said side rail having a C-shaped cross section;
- at least two elongated, generally linear aluminum cross members, each cross member having a generally C-shaped cross section with an embedded generally C-shaped bolt head channel located at or near a midsection of said C-shaped cross member, said C-shaped bolt head channel including opposing tabs which trap a bolt head in said bolt head channel, said bolt head channel extending a substantial length of said cross members;
- two bunk beams adapted to support said boat or watercraft above said trailer frame;
- open top U-shaped runner plates adapted to support said snowmobile or motorcycle;
- a flat bed adapted to support said all terrain vehicle and a shallow trailer bed;
- a plurality of beam supports for mounting said bunk beams, runner plates or flat bed to said trailer, said beam supports adapted to be movably mounted on said cross members via a plurality of bolts having bolt heads slidably disposed in said bolt head channels such that said beam supports are movably adjustable to accommodate said bunk beams, runner plates or flat bed;
- said bunk beams are elongated beams, each bunk beam having a generally rectangular cross section and having, at or near a midline of one wall forming said rectangular cross section a bunk beam C-shaped bolt head channel with a opposing tabs which trap a bolt head in said bolt head channel, said bunk beam supports each having an L-shaped bracket carrying a bunk beam bolt and a bunk beam bolt head, said bunk beam bolt head slidably disposed in said bunk beam bolt head channel thereby permitting said bunk beams to move forward and aft on said bunk beam supports due to the sliding of bolt heads in said bunk beam bolt head channels.

19. A kit for an aluminum trailer frame as claimed in claim 18 including an elongated aluminum tongue beam, said straight tip sections of said side rails adapted to be mounted to said tongue beam and said tongue beam extending forward beyond said straight tip sections.

20. A kit for an aluminum trailer frame as claimed in claim 18 wherein said pair of cross members are a rear cross member and a forward cross member, said rear cross member are adapted to be disposed at a rearward position spanning said opposing side rails and said forward cross member adapted to be disposed at a forward position relative to said rear cross member between opposing side rails; said trailer frame including trailer accessories adapted to be movably disposed by accessory bolts having accessory bolt heads slidably mounted in said bolt head channel of said rear cross member.

21. A kit for an aluminum trailer frame as claimed in claim 18 wherein said trailer accessories include tie-off cleat fittings, lights and license plate frame elements.

22. A kit for an aluminum trailer frame as claimed in claim 18 including a forward and an aft keel roller and respective roller support plates for said forward and aft keel rollers, said roller support plates being adapted to be movably mounted by keel support bolts having keel support bolt heads which are slidably retained in said bolt head channels of said cross members.

23. A kit for an aluminum trailer frame as claimed in claim 22 including a third cross member with a respective bolt head channel extending the length of said cross member, said cross members respectively adapted to be mounted and disposed at a rearward, an intermediate and a forward position relative to the opposing first and second side rails.

24. A kit for an aluminum trailer frame as claimed in claim 18 including a set of wheels rotatably mountable to said side rails.

* * * * *